United States Patent [19]

Wu

[11] Patent Number: 4,526,813

[45] Date of Patent: Jul. 2, 1985

[54] COMPOSITION AND METHOD FOR CORROSION INHIBITION

[75] Inventor: Yulin Wu, Bartlesville, Okla.

[73] Assignee: Phillips Petroleum Company, Bartlesville, Okla.

[21] Appl. No.: 465,077

[22] Filed: Feb. 9, 1983

Related U.S. Application Data

[63] Continuation of Ser. No. 369,293, Apr. 16, 1982, abandoned, which is a continuation-in-part of Ser. No. 181,913, Aug. 27, 1980, abandoned.

[51] Int. Cl.$^3$ .......................... B05D 7/22; B05D 1/18
[52] U.S. Cl. .................................... 427/235; 427/239; 427/435; 166/244 C; 252/8.55 E; 523/456
[58] Field of Search ............... 166/244 C; 252/8.55 E; 523/456; 427/235, 239, 435

[56] References Cited

U.S. PATENT DOCUMENTS

| | | | |
|---|---|---|---|
| 2,880,194 | 3/1959 | Glaser | 528/121 |
| 3,100,527 | 8/1963 | Hilton | 166/33 |
| 3,294,165 | 12/1966 | Meijs et al. | 166/295 |
| 3,355,315 | 11/1967 | Jorda et al. | 427/230 |
| 3,378,488 | 4/1968 | Nimerick | 252/8.55 |
| 3,391,738 | 7/1968 | Sparlin | 166/33 |
| 3,427,190 | 2/1969 | Murdock | 117/132 |
| 3,509,229 | 4/1970 | Shimp et al. | 525/510 |
| 3,552,493 | 1/1971 | Bezemer | 166/295 |
| 3,562,198 | 2/1971 | Slocombe | 260/37 |
| 4,143,000 | 3/1979 | Doss | 528/123 |

FOREIGN PATENT DOCUMENTS

| | | |
|---|---|---|
| 781412 | 8/1957 | United Kingdom . |
| 801705 | 9/1958 | United Kingdom . |
| 952992 | 3/1964 | United Kingdom . |
| 1102348 | 2/1968 | United Kingdom . |
| 1122813 | 8/1968 | United Kingdom . |
| 1167900 | 10/1969 | United Kingdom . |
| 1274704 | 5/1972 | United Kingdom . |
| 1371689 | 10/1974 | United Kingdom . |
| 1580919 | 12/1980 | United Kingdom . |

OTHER PUBLICATIONS

Potter, "Coatings for Steel Pipes", *Uses of Epoxy Resins*, 1975, pp. 64, 65 and 146.
"Epoxy Resin Coatings," Epoxy Resins, May and Tanaka, (1973), pp. 459–465.
"Solvents", pp. 24-29 to 24-31, Handbook of Epoxy Resins, Lee and Neville, (1967).

*Primary Examiner*—John C. Bleutge
*Assistant Examiner*—Robert E. L. Sellers, II

[57] ABSTRACT

A composition is provided which, when applied to a metal surface, forms a corrosion-inhibiting film thereon. The composition comprises an epoxy resin, an effective amount of a curing agent for the epoxy resin, an alcohol, and a hydrocarbon diluent. The composition is applied by contacting the metal surface with the composition as one solution or as a hydrocarbon solution of the epoxy resin and a solution comprising the alcohol and the curing agent. The composition is particularly useful in the treatment of down-well metal surfaces in oil and gas wells to inhibit the corrosion of the metal.

15 Claims, No Drawings

COMPOSITION AND METHOD FOR CORROSION INHIBITION

This is a continuation of pending application Ser. No. 369,293 filed Apr. 16, 1982, now abandoned, which is a continuation-in-part of pending application Ser. No. 181,913, filed Aug. 27, 1980, now abandoned.

BACKGROUND

This invention relates to the treatment of metal surfaces to increase their resistance to corrosion. It further relates to compositions which form a corrosion-resistant film or metal surfaces to which they are applied.

The problem of corrosion of metal surfaces in contact with air and water is well known. Corrosion and pitting are accelerated in environments in which metal surfaces are in contact with chemicals such as hydrogen sulfide, carbon dioxide and organic acids, and water having a high electrolyte concentration. Such environments are typical of down-well conditions in oil and gas wells, in which corrosion of metal pipes, pumps and other equipment poses a serious problem requiring monitoring of well sites, frequent maintenance and costly replacement of parts. Oil recovery operations in deep-sea oil fields present these corrosion problems in their most extreme form. The down-well metal surfaces are in contact with large quantities of corrosive chemicals such as dissolved acid gases present in the recovered oil, and in addition, the metal surfaces are subjected to temperatures of 250° F. or higher and pressures of 3000 psig or higher, the extreme conditions of temperature and pressure acting to accelerate corrosion and to intensify the problems of applying and maintaining chemical protection for the equipment. In offshore oil wells, secondary recovery operations involving water-flooding of the undersea formations subjects the down-well equipment to highly corrosive sea water containing dissolved oxygen.

Conventional corrosion-inhibiting agents are often not effective at all under such extreme conditions or reduce corrosion significantly for only a short period of time and then must be reapplied, often at great expense and inconvenience if the well site is not easily accessible or, as in the case of off-shore wells, poses difficulties of transporting and applying large volumes of chemicals.

It is therefore an object of this invention to provide a composition which can be applied to a metal surface to inhibit corrosion and pitting on the metal. It is a further object of the invention to provide a method of treating metal surfaces so as to form a film which inhibits corrosion on the metal even under extreme conditions of temperature and pressure and in highly corrosive environments. It is a further object of the invention to provide an article having a surface film of a composition which inhibits corrosion.

SUMMARY OF THE INVENTION

According to the invention, there is provided a composition which, when applied to a metal surface, forms a corrosion-inhibiting film on the metal surface, the composition comprising an epoxy resin, an effective amount of an amine curing agent for the epoxy resin, an alcohol, and a hydrocarbon diluent. The composition can be applied by contacting the metal surface with the composition so that a film is formed thereon. The composition can be applied as one solution or by sequentially contacting the metal with a hydrocarbon solution of the epoxy resin and a hydrocarbon solution of the alcohol and curing agent. Also according to the invention, metal articles having a corrosion-inhibiting film thereon are provided.

DETAILED DESCRIPTION OF THE INVENTION

Any epoxy resin having, on the average, more than one vicinal epoxy group per molecule can be used in the invention composition and process. The epoxy resin may be saturated or unsaturated, aliphatic, cycloaliphatic, aromatic or heterocyclic, and may bear substituents which do not materially interfere with the curing reaction. They may be monomeric or polymeric.

Suitable epoxy resins include glycidyl ethers prepared by the reaction of epichlorohydrin with a compound containing a hydroxyl group carried out under alkaline reaction conditions. The epoxy resin products obtained when the hydroxyl group containing compound is bisphenol A are represented below by structure I wherein n is zero or a number greater than 0, commonly in the range of 0 to 10, preferably in the range of 0 to 2.

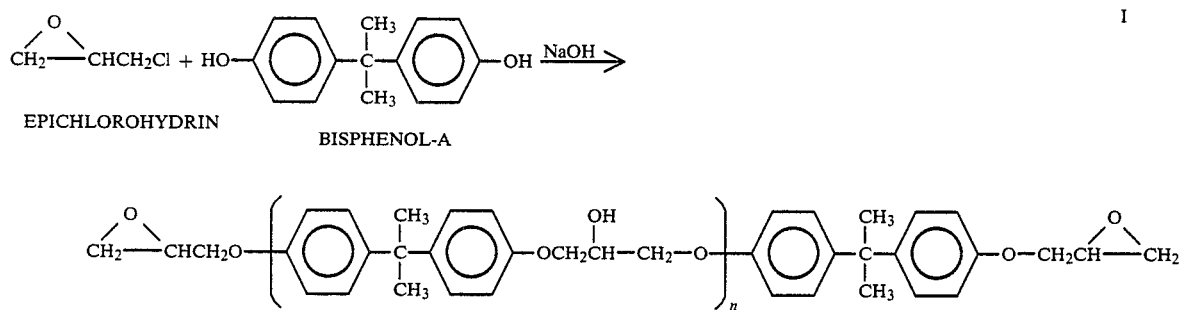

Other suitable epoxy resins can be prepared by the reaction of epichlorohydrin with mononuclear di- and tri-hydroxy phenolic compounds such as resorcinol and phloroglucinol, selected polynuclear polyhydroxy phenolic compounds such as bis(p-hydroxyphenyl)methane and 4,4'-dihydroxy biphenyl, or aliphatic polyols such as 1,4-butanediol and glycerol.

Epoxy resins suitable for use in the invention have molecular weights generally within the range of 50 to about 10,000, preferably about 2000 to about 1500. The commercially available Epon 828 epoxy resin, a reaction product of epichlorohydrin and 2,2-bis(4-hydroxyphenyl)propane (bisphenol A) and having a molecular weight of about 400, an epoxide equivalent (ASTM D-1652) of about 185–192, and an n value in structure I above of about 0.2, is presently preferred because of the superior effectiveness, as shown in field tests, of the invention composition containing Epon 828.

Additional epoxy-containing materials suitable for use in the present invention include the epoxidized derivatives of natural oils such as the triesters of glycerol with mixed long-chain saturated and unsaturated acids which contain, e.g., 16, 18 and 20 carbon atoms. Such natural oils are represented by formula II:

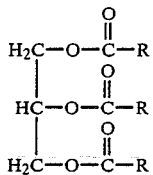

wherein R represents alkyl and/or alkenyl groups containing 15 to 19 carbon atoms with the proviso that epoxidation of said oils yields a polyepoxide having more than one vicinal epoxy group per molecule of epoxidized oil. Soybean oil is a typical triglyceride which can be converted to a polyepoxide suitable for use in the instant invention.

Other polyepoxides suitable for use in the present invention are derived from esters of polycarboxylic acids such as maleic acid, terephthalic acid, oxalic acid, succinic acid, azelaic acid, malonic acid, tartaric acid, adipic acid and the like with unsaturated alcohols as described by formula III:

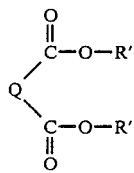

wherein Q represents a valence bond, or the following groupings: 1,2-phenylene, 1,4-phenylene, methylene, dimethylene, trimethylene, tetramethylene, pentamethylene, hexamethylene, heptamethylene, vinylene, 1,2-cyclohexylene, 1,4-cyclohexylene, 1,2-ethylenediol and the like, and R' represents alkylene and branched alkylene groups containing 4 to 14 carbon atoms. Representative epoxidized esters derived from materials described by structure (III) include the following: di(2,3-epoxybutyl)tetrahydrophthalate, di(2,3-epoxyoctyl)oxalate, di(2,3-epoxyisobutyl)adipate, di(3,4-epoxypentyl)succinate, di(4,5-epoxydodecyl)terephthalate, di(3,4-epoxyhexyl)phthalate, di(2,3-epoxybutyl)tartrate, di(7,8-epoxytetradecyl)adipate, di(3,4-epoxybutyl)glutarate, di(2,3-epoxyhexyl)pimelate, di(3,4-epoxyoctyl)suberate, di(4,5-epoxydecyl)azelate, di(2,3-epoxyisohexyl)tetrahydroterephthalate and the like.

In addition to the foregoing, it is contemplated that suitable polyepoxides can be derived from esters prepared from unsaturated alcohols and unsaturated carboxylic acids described by formula IV:

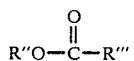

wherein R″ represents alkenyl and cycloalkenyl groups containing 4 to 12 carbon atoms and R‴ represents alkenyl and cycloalkenyl groups containing 4 to 12 carbon atoms. Representative epoxidized esters include the following: 2,3-epoxypentyl-3,4-epoxybutyrate; 2,3-epoxybutyl-3,4-epoxyhexanoate; 3,4-epoxyoctyl-2,3-epoxycyclohexane carboxylate; 2,3-epoxydodecyl-4,5-epoxyoctanoate; 2,3-epoxyisobutyl-4,5-epoxydodecanoate; 2,3-epoxycyclododecyl-3,4-epoxypentanoate; 3,4-epoxyoctyl-2,3-epoxycyclododecane carboxylate and the like.

Other unsaturated materials which can be epoxidized to give resins suitable for use in the instant process include butadiene based polymers such as butadiene-styrene copolymers, polyesters available as derivatives of polyols such as ethylene glycol with unsaturated acid anhydrides such as maleic anhydride, and esters of unsaturated polycarboxylic acids. Representative polyepoxides derived from the latter include the following: dimethyl 3,4,7,8-diepoxydecanedioate; dibutyl 3,4,5,6-diepoxycyclohexane-1,2-carboxylate; dioctyl 3,4,7,8-diepoxyhexadecanedioate; diethyl 5,6,9,10-diepoxytetradecanedioate and the like.

Dimers of dienes such as 4-vinyl cyclohexene-1 from butadiene and dicyclopentadiene from cyclopentadiene can be converted to epoxidized derivatives which are suitable for use in the instant process.

Any agent suitable for curing epoxy resins may be used in the invention composition and method. Curing agents for epoxy resins include amines, acids, anhydrides and aldehyde resins. The curing agent is used in an amount effective for curing the amount of epoxy resin used.

Curing agents suitable for use in the invention composition and process include compounds having amino hydrogen atoms. These include aliphatic, cycloaliphatic, aromatic and heterocyclic amines. Examples of curing compounds include aliphatic polyamines such as ethylene diamine, diethylene triamine, triethylene tetramine, tetraethylene pentamine, 1,4-aminobutane, 1,3-diaminobutane, hexamethylenediamine, 3-(n-isopropylamino)propylamine, N,N'-diethyl-1,3-propanediamine, hexapropyleneheptamine, penta(1-methyl-propylene)hexamine, tetrabutylenepentamine, hexa-(1,1-dimethylethylene)-heptamine, di(1-methylbutylene)triamine, pentaamylenehexamine, tri(1,2,2-trimethylethylene)tetramine, tetra(1,3-dimethylpropylene)pentamine, penta(1,5-dimethylamylene)hexamine, 5-methylnonanediamine, penta(1,2-dimethyl-1-isopropylethylene)hexamine and N,N'-dibutyl-1,6-hexanediamine.

A class of polyamines particularly suitable for use in the invention are N-alkyl- and N-alkylenyl-substituted-1,3-diaminopropanes and mixtures thereof. Examples of such polyamines include N-hexadecyl-1,3-diaminopropane, N-tetradecyl-1,3-diaminopropane, N-octadecyl-1,3-diaminopropane, N-pentadecyl-1,3-diaminopropane, N-heptadecyl-1,3-diaminopropane, N-nonadecyl-1,3-diaminopropane, and N-octadecenyl-1,3-diaminopropane. Various commercially available mixtures of N-alkylated and N-alkenylated diamines can be used in the invention. The presently preferred polyamine is a commercial product sold under the trademark Duomeen T. This product is N-tallow-1,3-diaminopropane in which the majority of the tallow substituent groups are alkyl and alkenyl containing from 16 to 18 carbon atoms each, with a minority of substituent groups having 14 carbon atoms each. It is presently believed that the effectiveness of Duomeen T in the corrosion-inhibiting composition stems from its relatively high molecular weight, which produces a long-chain "net" to cover the metal surface, its polyfunctionality, and its relatively high boiling point, which permits its use in high-temperature environments. Other commercially available materials include N-coco-1,3-diaminopropane in which the majority of the coco substituent groups contain 12 to 14 carbon atoms, commercially available under the tradename Duomeen C, and N-soya-1,3-diaminopropane, which contains $C_{18}$ alkenyl groups along with a minor proportion of $C_{16}$ alkyl groups.

Additional polyamines suitable for use in the invention can contain 3 or more nitrogen atoms as illustrated by the following examples: N-dodecyl-diethylenetriamine, N-tetradecyl-diethylene triamine, N-tetradecyl-dipropylenetriamine, N-tetradecyl triethylene tetramine and the corresponding N-alkenyl triamines.

Other curing agents which can be used include polyfunctional nitrogen-containing compounds such as, for example, amino acids, amino alcohols, amino nitriles, and amino ketones; sulfonic acids; carboxylic acids; and organic anhydrides.

Alcohols suitable for use in the invention include any alkanols containing at least one —OH functional group. These include alcohols containing 1 to about 15 carbon atoms such as methanol, ethanol, 1-propanol, 2-propanol, butanols, pentanols, hexanols, heptanols, octanols, 1-pentadecanol, and mixtures of these. Polyols containing 1 to 5 carbon atoms such as ethylene glycol, 1,3-propanediol, 2,3-butanediol, glycerol and pentaerythritol can also be used. Presently, methanol is preferred, particularly in an anti-corrosion composition containing xylene as the aromatic hydrocarbon diluent, Epon 828 as the epoxy resin, and Duomeen T as the polyamine, because Duomeen T is soluble in methanol at room temperature and because of the effectiveness of the resulting corrosion inhibiting system.

A hydrocarbon diluent is used for the invention composition. Examples of hydrocarbon diluents suitable for use in the treating agents include the isomeric xylenes, toluene, benzene, naphtha, cyclohexylbenzene, fuel oil, diesel oil, heavy aromatic oils, Stoddart solvent, crude oil, and condensate from gas wells. Presently, xylene is the preferred hydrocarbon diluent because it is an effective solvent for the other preferred components and because of the corrosion-inhibiting effectiveness of the resulting composition.

The higher-boiling aromatic hydrocarbons are particularly useful for deeper wells with higher downhole temperatures and in high-temperature gas and oil wells generally.

In some treatment methods, discussed below, it is advantageous to employ a carrier liquid or drive fluid to force a slug of the corrosion-inhibiting composition down into the well being treated. Any of the hydrocarbons listed above as suitable diluents may be used. For practical and economic reasons, diesel oil, sea water or condensate from the well being treated are preferred carrier fluids.

Various alcohol-aromatic hydrocarbon azeotropes can be used in the invention compositions to supply at least partially the diluent and the alcohol components. Representative azeotropes include the following, with the weight percent of each component in parenthesis: methanol (39.1)/benzene (60.9); ethanol (32)/benzene (68); 2-propanol (33.3)/benzene (66.7); 1-propanol (16.9)/benzene (83.1); isobutyl alcohol (9.3)/benzene (90.7); 1-butanol (68)/p-xylene (32); 2-pentanol (28)/toluene (72) and hexanol (13)/p-xylene (87). It is also contemplated that impure alcohol streams such as mixed butanols resulting from Oxo technology using propylene feedstock can be used in the treating compositions.

The components of the corrosion-inhibiting system can be mixed in any order, but it is presently preferred to dissolve the epoxy resin in a hydrocarbon and add an amine/alcohol/hydrocarbon mixture to this solution. A batch of the treating composition can be prepared by mixing a first solution of alcohol, hydrocarbon and amine in, for example, approximately a 1:1:1 (mL:mL:g) ratio and a second solution of an epoxy resin in a hydrocarbon in about a 3:1 (g:mL) ratio. The corrosion-inhibiting agent is then prepared by mixing the first and second solutions in such proportions that the weight ratio of polyamine to epoxy resin in the final solution varies over the broad range of about 1000:1 to 1:500, preferably about 100:1 to 1:50, and most preferably about 10:1 to 1:5. The weight percent of alcohol in the final composition varies over the broad range of 1 to 99, preferably 10 to 60, and most preferably 20 to 30. The hydrocarbon diluent can be present in any concentration range in which the invention composition remains in an essentially fluid pumpable state.

In laboratory runs and field tests, it has been found that a highly effective composition for the treatment of downhole metal surfaces of oil wells is one having an excess of the amine with respect to the epoxy. A particularly suitable composition for such a highly corrosive environment contains an equivalent ratio of polyamine to epoxy of greater than about 1:1, preferably about 1.25:1 to 10:1, most preferably about 1.5:1 to 5:1. The protective film obtained with such an amine-rich system generally has, in contrast to the hard coatings obtained with conventional cured epoxy systems, a tacky, comparatively soft consistency.

The polyamine:epoxy molar ratio corresponding to the preferred equivalent ratios above depends, of course, on the relative number of functional groups of the specific compounds used, and these ratios can be computed by methods known in the art. For example, for a polyamine containing 3 active hydrogen atoms and an epoxy resin having an average of 2 epoxide groups per molecule, the stoichiometric molar ratio of polyamine:epoxy resin is 0.67:1. The preferred compositions containing such polyamines and epoxy resins have a molar ratio of at least about 0.8:1, preferably within the range of about 1.1:1 to 10:1, most preferably about 1.25:1 to 6:1. The corresponding volume amounts for the preferred components, based upon a density of about 0.821 g/mL and molecular weight of 350 for the polyamine and about 1.164 g/mL and 400 for the epoxy resin, are generally at least about 1.0:1, preferably about 1.3:1 to 12:1, most preferably about 1.5:1 to 7:1.

Although compositions having an extremely large excess of amine are effective corrosion inhibitors, such compositions have the disadvantage of low durability in extremely corrosive environments such as downwell surfaces. By contrast, the invention compositions have high corrosion inhibition effectiveness over an extended period of time, reducing costs, in terms of time, money, equipment failures, and the necessity of frequent reapplication under the severe conditions of off-shore platform wells.

The invention composition is useful for coating oxidizable metal surfaces, particularly surfaces of objects made from iron and steel. It is particularly useful for treating metal surfaces such as metal pipes and casings in oil, gas and geothermal wells, which are subjected to high temperature and pressures and corrosive chemical agents.

Down-well treatments with the corrosion-inhibiting compositions can be effected by a variety of methods depending upon the particular chemical and physical characteristics of the well being treated. When treating metal surfaces, particularly in down-well applications, the corrosion-inhibiting composition can be applied as one solution, or alternatively it can be applied by contacting the metal surfaces sequentially with a solution of the curing agent and a solution of the epoxy resin. In practice, the resin solution and amine solution can be pumped from separate storage tanks to a static mixer at a T-juncture immediately prior to pumping the mixture downhole. The following down-well treatment methods can be used to apply the composition to metal surfaces of equipment used to recover natural fluids from a subterranean reservoir.

Batch Treatment. The invention composition comprising alcohol, epoxy resin, curing agent and hydrocarbon diluent is introduced preferably in an oil carrier into the annulus of a cased wellbore between the casing and the tubing. The well is returned to production and the injected compositions are gradually returned with the produced fluids, effecting en route the coating of contacted metal surfaces with a corrosion-resistant film. Alternatively in this method, a liquid column of the treating agent can be placed in the tubing or the annular space and allowed to stand for a time which can range from 10 minutes to 24 hours before resuming production, usually at least 2 hours.

Extended Batch Treatment. The invention composition is injected into the annular space of a cased wellbore, the well is closed off, and the composition is continuously circulated with well fluids down the annulus and up the tubing for an extended period of time which can vary widely but will usually be between 6 and 48 hours. At the end of the determined time period, the well is returned to production.

Squeeze Treatment. The invention composition is injected down a cased wellbore penetrating a subterranean formation and is forced into the formation against formation pressure with high-pressure pumps. The composition can be injected within a gelled or dispersed polymer matrix based, for example, on polyacrylamides, biopolysaccharides, or cellulose ethers. After the pressure is released, the treating agent is slowly produced back with the recovered fluids, resulting in the application of a corrosion-resistant film on metal surfaces contacted by the treating agent as it flows to the surface. This method is particularly suitable in high-pressure gas or oil wells.

Spearhead Treatment. A highly concentrated slug of the invention composition, for example about 27 weight percent alcohol, about 27 weight percent amine, about 15 weight percent epoxy resin, about 31 weight percent hydrocarbon diluent, is injected into the tubing of a cased borehole and pressured down the tubing with a fluid column of a brine solution such as 2 weight percent aqueous potassium chloride. When the pressure is released, the aqueous brine column and the corrosion-inhibiting composition are produced up the tubing. The composition as a concentrated slug thus contacts the metal walls of the tubing and lays down a protective film as it flows in a downward and upward circuit.

Metal surfaces can also be protected by dipping or spraying the surfaces with the invention compositions and then allowing excess fluid to drain from the treated surfaces at ambient conditions. A protective film is thus formed on the metal surface without conventional heat-curing or extended air-drying treatment, although such drying treatments can be used if desired and if conditions permit it. The advantage in using an anti-corrosion system which does not require air- or heat-drying is that the system can be applied to metal surfaces which are hundreds or thousands of feet below ground level or are in an environment which is always flooded with brine or other fluids.

When applying the composition to the metal tubing of, for example, a gas or oil well, it is not necessary to pre-coat the treated metal surfaces with oil or other substances prior to applying the invention composition, and the treated surfaces may or may not have an oil coating prior to the application. The invention has been found effective in inhibiting corrosion in wells producing as much as 95 percent brine and 5 percent oil.

The nature of the film thus formed can vary according to the particular composition used and the environment in which it is applied, but it has been found that the film will generally be a soft, sticky layer adhering to the metal surface. It is not necessary that the composition harden to a tough coating, and it has been found in laboratory runs that the applied film tends to maintain a tacky or greasy consistency.

EXAMPLE I

This example describes the treatment of an open-ended cased borehole in the North Burbank field in Oklahoma to inhibit corrosion on metal surfaces of the down-well equipment. The test well was a low fluid level well producing about 550 barrels of water per day (bwpd) and 4–5 barrels of oil per day (bopd).

A solution of xylene, methanol and amine curing agent was mixed with a xylene solution of an epoxy resin to give a total of 25 gallons of the invention treating composition. The final composition was 27 weight percent methanol, 27 weight percent Duomeen T curing agent, 15 weight percent Epon 828 epoxy resin, and 31 weight percent xylene.

The 25 gallons of inhibitor solution were poured into the annulus of the closed well. The fluids were circulated through the tubing and annulus for about 24 hours in an extended batch treatment. The well was returned to production and the corrosion rate was monitored by a conductivity probe for a period of 54 days. Prior to injection of the invention composition, the rate of corrosion was about 3.6 mils per year (mpy). During the subsequent 53-day period, the corrosion rate dropped and stayed below the target rate of 0.5 mpy. The iron count measurements in the produced water decreased from 33 ppm initially to about 24 ppm and remained at that level.

After 53 days, the corrosion rate had increased to 0.5 mpy, where it remained for 3 days. The well was then retreated with a 5-gallon batch of the same corrosion-inhibiting composition. The same extended batch treatment was used, except that the fluids were circulated for 6 hours instead of 24 hours. Following this retreatment, the corrosion rate remained in the range of 0.1 to 0.45 mpy for 21 days.

In an alternate method of treatment using the same composition, a 5-gallon batch of the invention corrosion inhibitor was poured directly into the annulus and flushed for five minutes without shut-in for circulation of the fluids. The corrosion rate remained below 0.5 mpy for about one week, after which the well was retreated by the same method. Two weeks later, when the testing ended, the corrosion rate was 0.1, confirming the effectiveness of the invention corrosion inhibitor in a batch treatment operation.

Prior to the testing of the invention composition, a commercially available, long-chain, high-boiling amine corrosion inhibitor had been used. The treatment program consisted of flushing eleven gallons of the commercial corrosion inhibitor into the annulus initially and then retreating with five quarts every four days to control corrosion. The invention composition was considerably more efficient in terms of its effectiveness in controlling corrosion rate over an extended period of time than was the commercial inhibitor.

EXAMPLE II

This example describes the treatment of an open-ended cased borehole in the North Burbank field in Oklahoma to inhibit corrosion on down-hole metal surfaces. The test well was a high fluid level well producing about 1250 bwpd and 6 bopd.

A solution of xylene, methanol and Duomeen C curing agent was mixed with a xylene solution of Epon 828 epoxy resin to give a total of 15 gallons of a composition containing 31 weight percent xylene, 27 weight percent methanol, 27 weight percent Duomeen T and 15 weight percent Epon 828.

The 15 gallons of inhibitor solution were poured into the annulus of the closed well. The well fluids and inhibitor were circulated through the tubing and annulus for 24 hours in an extended batch treatment process. The well was returned to production and the corrosion rate was monitored by a conductivity probe for a period of about two weeks. During this time the corrosion rate was generally greater than the target rate of 0.5 mpy. A subsequent treatment with an additional 15-gallon batch of the Duomeen C-containing inhibitor failed to reduce the corrosion rate to this level over a 7-day period. The corrosion rate was 3.5 mpy when the inhibitor composition of Example I (containing Duomeen T curing agent) was applied to this well.

A 15-gallon volume of the Duomeen T-containing composition described in Example I was placed in the test well and circulated for 24 hours. The corrosion rate decreased from 3.5 mpy to about 0.1–0.2 mpy and remained below the target level of 0.5 for a period of about 98 days. Iron count during this time remained in the range of 14–17 ppm. Previously in this well, it was necessary to apply a commercial inhibitor in an initial 11-gallon treatment and follow every four days with 7-quart treatments. This result demonstrates the efficiency and effectiveness of the xylene/Duomeen T/methanol/Epon 828 system in reducing the corrosion rate in cased oil wells. It also demonstrates the necessity of determining the appropriate corrosion inhibitor solution for each well or set of well conditions. A composition containing Duomeen C was an effective corrosion inhibitor in the laboratory under simulated well conditions, but did not perform effectively under the conditions encountered in this particular test well using the extended batch treatment method.

EXAMPLE III

This example describes the use of the invention composition for reducing the corrosion rate in a hot gas condensate well in the Parcperdue Field, Lafayette Parish, Louisiana. The well was a hot (about 256° F.) gas condensate well producing about 7.2 MMcfd gas containing 1 percent carbon dioxide, 3 bwpd and 400 bpd condensate. The well depth was 13,266 feet and the wellhead pressure was 6000 psig.

A total of 72 barrels of the invention composition in a carrier of heavy aromatic oil was pumped into the well. The injected fluid contained 2.2 weight percent methanol, 2.2 weight percent Duomeen T curing agent, 1.2 weight percent Epon 828 epoxy resin, 2.5 weight percent xylene, and 91.9 weight percent heavy aromatic oil. After the tubing was filled with the fluid, the well was shut in for about 1.5 hours. The inhibitor fluid was then returned to the surface and production was resumed.

Prior to this treatment the iron level was 195 ppm, but two days after the treatment the iron count had dropped to 56 ppm. The iron level then gradually increased and reached a level of 92 ppm eleven days after treatment. At the end of about 30 days after treatment, the iron level had reached 200 ppm and a retreatment was carried out using the portion of the original solution which had been returned to the surface during the initial treatment. An additional 4.6 volume percent of the invention composition was added and 72 barrels of this mixture was pumped into the well, the treatment method being the same except that the residence time was increased from 1.5 hours to 24 hours. The iron concentration decreased to 56 ppm but then gradually increased to 101 ppm over a 23-day period and remained at this level for seven days. At this time it was decided to use a spearhead treatment method on the well as described below.

Six and one-half barrels of a concentrated solution of the invention composition containing 27 weight percent methanol, 27 weight percent Duomeen-T, 15 weight percent Epon 828 and 31 weight percent xylene were injected into the well followed by 66 barrels of 2 weight percent aqueous potassium chloride solution. This volume was designed to fill the tubing to within about 300 feet of the well bottom and avoid injection of the chemicals into the formation. The well was shut in for about 1.5 hours and then returned to production. The initial iron concentration in the produced water dropped from 100 ppm to 54 ppm in 12 days. The iron count remained in the range of 42 to 55 ppm over a period of 37 days.

EXAMPLE IV

A series of laboratory corrosion inhibition tests were carried out in 1-liter Erlenmeyer flasks equipped with magnetic stirring bars, under laboratory conditions designed to simulate corrosive oil-water environments encountered in field drilling sites. A charge of 50 mL of crude oil and 950 mL of synthetic brine was used in each run. A slow stream of carbon dioxide was bubbled through the solution during each test to maintain the mixture near saturation with $CO_2$ at ambient conditions. After charging 950 mL of synthetic North Sea water (93.1 g $CaCl_2$ $2H_2O$, 46.4 g $MgCl_2$ $6H_2O$ and 781.1 g NaCl per 5 gal. distilled $H_2O$) into the Erlenmeyer flask, the resin/hydrocarbon solution and amine/alcohol/hydrocarbon solution were individually charged to the flask, then the specified crude oil was added. The rate of corrosion and pitting index were determined using a Corrater ® monitoring system available from Rohrback Instruments. A carbon steel probe was suspended in the stirred oil-water mixture maintained at approximately 49° C. during each run.

In a typical run, individual mixtures of 1:1:1 by weight samples of amine/alcohol/hydrocarbon and 3:1 by weight samples of resin/hydrocarbon were prepared. For these laboratory runs, it was convenient to make a first solution of 1 g Duomeen T, 1 g methanol and 1 g xylene, and a second solution of 3 g Epon 828 and 1 g xylene. Specified aliquots of these solutions were then transferred to the oil-water mixture contained in the 1-L Erlenmeyer flasks. The corrosion rate and pitting index were observed after various reaction times. Results of the tests are summarized in Table I.

TABLE I

| Run | Sol. A[a] (g) | Sol. R[b] (g) | Crude Oil | Reaction Time (hrs) | Corrosion Rate (mpy) | Pitting Index |
|---|---|---|---|---|---|---|
| 1 | 0.63 g | 0.158 g | Tor | 3 | 0.04 | 0.00 |
| 2 | 0.6[c] | 0.1[d] | NBU[e] | 21 | 0.07 | 0.00 |
| 3 | 0.42[f] | 0.158 | Tor | 3 | 2 | 1.5 |
| 4 | 0.32 | 0.079[g] | Tor | 5 | 0.16 | 0.10 |
|   |       |          |     | 21 | 0.1 | 0.05 |
| 5 | 0.22[h] | 0.079 | Tor[m] | 5 | 2.0 | 0.6 |
|   |       |          |     | 21 | 0.25 | 0.1 |
| 6 | 0.2[i] | 0.05[j] | Te[k] | 21 | 0.02 | 0 |
| 7 | 0.2[i] | 0.05[j] | NBU[e] | 21 | 0.1 | 0 |

[a]Solution A represents the amine/alcohol/hydrocarbon mixture.
[b]Solution R represents the resin/hydrocarbon mixture.
[c]A 0.6 mL aliquot of solution A was used in this run.
[d]A 0.6 g sample of Epon 828 was used as solution R.
[e]NBU represents North Burbank Unit crude oil used with NBU brine (96.3 g MgCl$_2$ 6H$_2$O, 289.2 g CaCl$_2$ 2H$_2$O, 1259 g NaCl in 5 gal. distilled H$_2$O).
[f]This solution contained no methanol (0.21 g Duomeen T and 0.21 g xylene).
[g]An additional gram of methanol was added to this mixture.
[h]This solution contained no methanol (0.11 g Duomeen T and 0.11 g xylene).
[i]A 0.2 mL aliquot of a solution containing ⅓ amine ⅔ (70% xylene and 30% isopropanol) was used.
[j]A 0.05 mL aliquot of a solution containing 75% resin and 25% xylene was used.
[k]Te represents Teesside crude oil used with synthetic North Sea water.
[m]Tor crude oil used with synthetic North Sea water.

The runs in Table I demonstrate the effectiveness of the invention alcohol-containing compositions for inhibiting corrosion in systems containing Tor crude oil (Runs 1 and 4) and North Burbank crude oil (Run 2) using methanol as the alcohol. Runs 3 and 5 show the reduced effectiveness of the amine/hydrocarbon/resin system in the absence of an alcohol. Runs 6 and 7 demonstrate the effectiveness of the invention isopropanol-containing compositions for inhibiting corrosion in systems containing Teeside crude oil and North Burbank Unit crude oil, respectively.

EXAMPLE V

This example provides a hypothetical method of treatment for an off-shore oil well having a depth of about 15,000 feet, formation temperatures of 300° F. or higher, and pressures on the order of 5000 psig. An amine solution containing equal parts by weight of xylene, methanol and Duomeen T and a solution containing 3 parts by weight of Epon 828 and 1 part by weight of xylene are used in the ratio of 4 parts by volume of the amine solution to 1 part by volume of the epoxy solution. The solutions are combined in a static mixer at a T-junction before injection into the well. Two barrels of the inhibitor solution are injected for each 5000 feet of 3⅞" I.D. tubing. The injection of inhibitor solution is followed with 10 to 15 barrels of formation water or fresh water. The inhibitor is displaced down the tubing with diesel oil as far as practical without injecting inhibitor into the formation, and the well is then shut in for about three hours. The well is returned to normal production while 50 to 100 ppm of an emulsion-breaker such as Nalfloc VH35E is injected into the produced fluids upstream of the condensate storage tank or separator. This emulsion-breaking treatment may be necessary to prevent the formation of an emulsion or highly-condensed product, presumably caused by injection of an excess of the concentrated inhibitor solution.

EXAMPLE VI

The runs in Table II demonstrate the effectiveness of invention systems containing Duomeen C as the polyamine curing agent. Duomeen C is described by the general formula R'NH(CH$_2$)$_3$NH$_2$ wherein R' represents straight chain hydrocarbon radicals containing on the average 12 to 14 carbon atoms. The laboratory runs were carried out as described in Example IV.

TABLE II

| Run | Sol. A[a] (g) | Sol. R[b] (g) | Crude Oil | Reaction Time (hrs) | Corrosion Rate (mpy) | Pitting Index |
|---|---|---|---|---|---|---|
| 8 | 0.45 | 0.13 | NBU[c] | 21 | 0.25 | 0.11 |
| 9 | 0.60 | 0.17 | Tor[d] | 22.5 | 0.25 | 0.1 |
| 10 | 0.45 | 0.13 | Tor[d] | 18 | 0.05 | 0.01 |
| 11 | None[e] | None[e] | Tor[d] | 22.5 | 0.45 | 0.2 |

[a]Solution A was prepared by mixing equal weights of xylene, methanol and Duomeen C.
[b]Solution R was prepared by mixing 10 parts by weight of Epon 828 with 3 parts by weight of xylene.
[c]NBU represents North Burbank Unit crude oil used with NBU brine. A 50 mL sample of oil was used with 950 mL of brine.
[d]Tor represents Tor crude oil used with synthetic North Sea water.
[e]In run 11 0.2 g of KP 2023 (a commercial inhibitor from Tretolite Corp.) was used.

EXAMPLE VII

The runs in Table III demonstrate the effectiveness of inventive systems containing varying ratios of the resin/hydrocarbon solution (Solution R) and the amine/alcohol/hydrocarbon solution (Solution A). Duomeen T was used as the polyamine curing agent. Duomeen T is described by the general formula R$_2$NH(CH$_2$)$_3$NH$_2$ wherein R$_2$ represents straight chain hydrocarbon radicals containing on the average 16 to 18 carbon atoms. The laboratory runs were carried out as described in Example IV.

TABLE III

| Run | Sol. A[a] (g) | Sol. R[b] (g) | Crude Oil | Reaction Time (hrs) | Corrosion Rate (mpy) | Pitting Index |
|---|---|---|---|---|---|---|
| 12 | 0.1 | 0.4 | NBU[c] | 23 | 0.7 | 0.05 |
| 13 | 0.4 | 0.1 | NBU | 23 | 2.6 | 0.1 |
| 14 | 0.2 | 0.3 | NBU | 20.5 | 3.8 | 0.4 |
| 15 | 0.3 | 0.2 | NBU | 21 | 2.2 | 0.6 |
| 16 | 0.2 | 0.3 | NBU | 23.5 | 2.0 | 0.3 |
| 17 | 0.3 | 0.2 | NBU | 7 | 0.46 | 0.2 |
| 18 | 0.4 | 0.1 | NBU | 22 | 5.2 | 0.8 |
| 19 | 0.3 | 0.2 | NBU | 22 | 0.75 | 0.3 |
| 20 | 0.3 | 0.2 | NBU | 20 | 0.80 | 0.01 |
| 21 | 0.15 | 0.1 | NBU | 22.5 | 0.08 | 0.02 |
| 22 | 0.45 | 0.13 | Tor[d] | 21 | 0.02 | 0 |
| 23 | None | None | Te[e] | 20.7 | 110 | 0 |

[a]The amine solution (Solution A) was prepared by mixing 1 part by weight of the amine with 1 part by volume of alcohol and 1 part by volume of xylene, e.g., 5 g of Duomeen T with 5 mL of methanol and 5 mL of xylene.
[b]The resin solution (Solution R) was prepared by mixing 3 parts by weight of the epoxy resin with 1 part by volume of xylene, e.g., 30 g of Epon 828 with 10 mL of xylene.
[c]North Burbank Unit crude oil used with NBU brine.
[d]Tor crude oil used with synthetic North Sea water.
[e]Teesside (mixed crude oil from North Sea complex) crude oil with synthetic North Sea water.

EXAMPLE VIII

Laboratory runs were performed to demonstrate the effect of varying the molar ratio of the amine component with respect to the epoxy resin component. Selected ratios were treated in a series of runs and the results summarized in Table IV. The runs were carried out essentially as described in Example IV above. The runs were carried out in the presence of 950 mL of synthetic North Sea water and 50 mL Teesside crude oil under a CO₂ stream at 49° C. for 20 hours.

TABLE IV

Corrosion Inhibition in Duomeen-T/Epon 828 Systems With Selected Amine:Epoxy Molar Ratios

| Run | Sol. A (mL)[a] | Sol. R (mL)[b] | Vol. Ratio Sol. A/Sol. R | Eq. Ratio A/R | Molar Ratio (A/R) | 20 Hr. Test Results Corrosion Rate (mpy) | Pitting Index |
|---|---|---|---|---|---|---|---|
| 1 | 0.1 | 0.05 | 2 | 2.46 | 1.64 | 0 | 0.01 |
| 2 | 0.1 | 0.1 | 1 | 1.25 | 0.83 | 0.01 | 0.01 |
| 3 | 0.1 | 0.2 | 0.5 | 0.62 | 0.41 | 0.08 | 0.03 |
| 4 | 0.1 | 0.3 | 0.33 | 0.42 | 0.28 | 0.31 | 0.01 |
| 5 | 0.1 | 0.4 | 0.25 | 0.31 | 0.204 | 0.22 | 0.02 |
| 6 | 0.1 | 0.7 | 0.14 | 0.18 | 0.118 | 0.90 | 0.15 |
| 7 | 0.2 | 0.05 | 4 | 4.94 | 3.29 | 0.01 | 0 |
| 8 | 0.2 | 0.1 | 2 | 2.49 | 1.66 | 0.03 | 0.01 |
| 9 | 0.2 | 0.2 | 1 | 1.23 | 0.82 | 0.10 | 0.03 |
| 10 | 0.2 | 0.6 | 0.33 | 0.41 | 0.275 | 0.15 | 0.02 |
| 11 | 0.2 | 1.4 | 0.14 | 0.18 | 0.118 | 0.20 | 0.03 |
| 12 | 0.2 | 2.0 | 0.1 | 0.12 | 0.0824 | 4.6 | 2.5 |

[a]Solution A was prepared by mixing equal weights of xylene, methanol and Duomeen T.
[b]Solution R was prepared by mixing 10 parts by weight of Epon 828 with 20 parts by weight of xylene.

Referring to the results tabulated in Table IV, the best results were obtained in systems having a molar ratio of amine to resin varying over the range of 0.41:1 to 3.29:1 (see runs 1, 2, 3, 7, 8, 9). The corresponding volume ratios of the amine solution to the resin solution in these runs varied over the range of 0.5:1 to 4:1. In the less effective systems (runs 4, 5, 6, 10, 11, 12), the molar ratios of the amine to resin varied over the range of 0.08:1 to 0.28:1. The corresponding volume ratios of the amine solution to the resin solution in these latter runs varied over the range of 0.1:1 to 0.33:1.

I claim:

1. A method for treating metal surfaces of drilling equipment in a well for the recovery of natural fluids from a subterranean reservoir, the method comprising injecting a composition comprising an epoxy resin, an N-tallow-1,3-diaminopropane curing agent for the epoxy resin present in an amount such that the equivalent ratio of the curing agent to the epoxy resin is from about 1.5:1 to about 5:1, an aromatic hydrocarbon diluent present in at least an amount sufficient to maintain the composition in an essentially fluid state, and methanol present in an amount of about 10 to about 60 weight percent of the composition into the well and allowing the composition to contact the metal surfaces for a time sufficient to form a corrosion-inhibiting film thereon.

2. The method of claim 1 for inhibiting corrosion of metal surfaces of drilling equipment in a well for the recovery of natural fluids from a subterranean reservoir, comprising the steps of:
    (a) stopping production of the natural fluids;
    (b) injecting the composition into the well; and
    (c) returning the well to production, thereby causing the composition to be returned with the natural fluids and to be deposited as a corrosion-inhibiting film en route on metal surfaces with which it comes in contact.

3. A method according to claim 2 in which the drilling equipment includes tubing within a well casing, the method further comprising injecting the composition between the tubing and casing, circulating the composition through the tubing and between the tubing and casing for a time at least sufficient to form a corrosion-inhibiting film thereon before returning the well to production.

4. The method of claim 1 in which the composition is forced down the well using a drive fluid.

5. The method of claim 2 in which at least a portion of the well is at a temperature of at least about 300° F. and a pressure of at least about 6000 psig.

6. A method for treating metal surfaces of drilling equipment in a well for the recovery of natural fluids from a subterranean reservoir, the method comprising injecting a composition comprising:
    (a) an epoxy resin having more than one vicinal epoxide group per molecule;
    (b) an N-tallow-1,3-diaminopropane curing agent for the epoxy resin, the curing agent and epoxy being present in an equivalent ratio of from about 1.5:1 to about 5:1;
    (c) a hydrocarbon diluent present in an amount to maintain the composition in an essentially fluid state; and
    (d) methanol present in an amount of about 10 to about 60 weight percent, based on the weight of the composition, into the well and allowing the composition to contact the metal surfaces for a time sufficient to form a corrosion-inhibiting film thereon.

7. The method of claim 6 for inhibiting corrosion of metal surfaces of drilling equipment in a well for the recovery of natural fluids from a subterranean reservoir, comprising the steps of:
    (a) stopping production of the natural fluids;
    (b) injecting the composition into the well; and
    (c) returning the well to production, thereby causing the composition to be returned with the natural fluids and to be deposited as a corrosion-inhibiting film en route on metal surfaces with which it comes in contact.

8. The method of claim 7 in which the drilling equipment includes tubing within a well casing, the method further comprising injecting the composition between the tubing and casing, circulating the composition through the tubing and between the tubing and casing for a time at least sufficient to form a corrosion-inhibiting film thereon before returning the well to production.

9. The method of claim 6 in which the composition is forced down the well using a drive fluid.

10. The method of claim 6 in which at least a portion of the well is at a temperature of at least about 300° F. and a pressure of at least about 6000 psig.

11. The method of claim 10 in which the composition comprises N-tallow-1,3-diaminopropane, an epoxy resin which is the reaction product of an epichlorohydrin and a polyhydric alcohol and has an epoxide equivalent within the range of 185 to 192, a hydrocarbon diluent and methanol, wherein the molar ratio of the N-tallow-1,3-diaminopropane to the epoxy resin is in the range of about 1.1:1 to about 10:1.

12. The method of claim 1 in which the aromatic hydrocarbon diluent is xylene.

13. The method of claim 1 in which the epoxy resin is the reaction product of epichlorohydrin and a polyhydric alcohol and has an epoxide equivalent within the range of 185 to 192.

14. The method of claims 1 in which the alcohol is present in an amount of about 20 to 30 weight percent, based on the weight of the composition.

15. The method of claim 1 in which the amine:epoxy equivalent ratio in the composition is about 1.5:1.

* * * * *